United States Patent
Tsai et al.

(10) Patent No.: US 8,075,174 B2
(45) Date of Patent: Dec. 13, 2011

(54) LIGHT GUIDE PLATE MICROSTRUCTURE

(75) Inventors: Shau-Yu Tsai, Hsin-Chu (TW); Super Liao, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 340 days.

(21) Appl. No.: 12/418,705

(22) Filed: Apr. 6, 2009

(65) Prior Publication Data

US 2010/0135042 A1  Jun. 3, 2010

(30) Foreign Application Priority Data

Dec. 3, 2008  (TW) ................................ 97146958 A

(51) Int. Cl.
*F21V 7/04* (2006.01)
(52) U.S. Cl. ........ 362/620; 362/626; 362/619; 362/625; 362/339
(58) Field of Classification Search .................. 362/620, 362/626, 619, 625, 330, 339, 628, 606, 607, 362/223, 224, 97.1–97.4; 385/146
See application file for complete search history.

(56) References Cited

U.S. PATENT DOCUMENTS

| | | | | |
|---|---|---|---|---|
| 6,854,855 B2 * | 2/2005 | Munro et al. | ................. | 362/620 |
| 7,018,061 B2 * | 3/2006 | Chen | ................. | 362/619 |
| 7,717,604 B2 * | 5/2010 | Mai | ................. | 362/620 |
| 7,744,263 B2 * | 6/2010 | Bottomley | ................. | 362/618 |
| 7,768,710 B2 * | 8/2010 | Yang et al. | ................. | 359/641 |
| 2005/0105282 A1 * | 5/2005 | Yu et al. | ................. | 362/31 |
| 2007/0070649 A1 * | 3/2007 | Won et al. | ................. | 362/620 |
| 2007/0127268 A1 | 6/2007 | Chen | | |
| 2008/0239204 A1 | 10/2008 | Lee et al. | | |
| 2009/0059128 A1 * | 3/2009 | Han et al. | ................. | 349/65 |
| 2009/0231859 A1 * | 9/2009 | Yeh et al. | ................. | 362/339 |
| 2010/0046200 A1 * | 2/2010 | Kuo | ................. | 362/97.1 |

FOREIGN PATENT DOCUMENTS

| | | |
|---|---|---|
| CN | 101276019 | 10/2008 |
| JP | 2005-85671 | 3/2005 |
| TW | 2005-23503 | 7/2005 |
| TW | I260434 | 8/2006 |
| TW | M314346 | 6/2007 |
| TW | I285721 | 8/2007 |
| TW | M317021 | 8/2007 |
| TW | I287116 | 9/2007 |

OTHER PUBLICATIONS

English language translation of abstract of I285721.
English language translation of abstract of 2005-23503.
English language translation of abstract of M314346.
English language translation of abstract of I287116.
English language translation of abstract of M317021.
English language translation of abstract of I260434.
English language translation of abstract and pertinent parts of JP 2005-85671 (published on Mar. 31, 2005).
English language translation of abstract and pertinent parts of CN 101276019 (published on Oct. 1, 2008).

* cited by examiner

*Primary Examiner* — Bao Q Truong
(74) *Attorney, Agent, or Firm* — Thomas, Kayden, Horstemeyer & Risley, LLP

(57) ABSTRACT

A light guide plate microstructure is provided. The light guide plate microstructure is located on at least one surface of the light guide plate and has a plurality of groove units. Each groove unit has multiple V-shaped grooves, and each V-shaped groove has an apex angle within a range of about 80°-160°. Furthermore, at least two of the V-shaped grooves of a groove unit have different apex angles.

14 Claims, 5 Drawing Sheets

LIGHT GUIDE PLATE MICROSTRUCTURE

RELATED APPLICATIONS

This application claims priority to Taiwan Application Serial Number 97146958, filed Dec. 3, 2008, which is herein incorporated by reference.

BACKGROUND

1. Field of Invention

The present invention relates to light guides of backlight modules. More particularly, the present invention relates to microstructures of light guides.

2. Description of Related Art

A backlight module illuminates a liquid crystal displays (LCD) from the side or back and can be used in small displays to increase readability in low light conditions and in computer displays and LCD televisions to produce light in a manner similar to a CRT display.

Light-emitting diodes (LEDs) and cold cathode fluorescent lamps (CCFLs) are common backlight module light sources. Presently, the most popular source of backlight module is CCFL, however, with the increasing demand for light and compact displays, the usage of LED backlights has been growing since the LED component is smaller than CCFL in size. However, LED is a point light source with high directivity and thus the liquid crystal display using an LED backlight module would suffer from problems such as hot spots. In order to alleviate this and other problems, diffusive means and/or light guides are designed to direct the light radiated by LED toward the panel of LCD so as to improve the luminance uniformity thereof.

The advancements in LED epitaxy and packaging technology have significantly increased the luminance of LED, and hence manufacturers are eager to cut down the number of the LEDs used so as to reduce the production cost. However, said hot spot issue would get even worse when using fewer LEDs and/or brighter LEDs.

In view of the foregoing, one challenge in the related field is to provide structures and means to obtain good luminance uniformity of LED light source.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

In one aspect, the present invention is directed to a light guide plate microstructure. According to one embodiment of the present invention, the light guide plate microstructure is located on at least one surface of a light guide plate and comprises a plurality of groove units located continuously or discontinuously on said surface of the light guide plate. Each of the groove units comprises a plurality of V-shaped grooves. Each of the V-shaped grooves has an apex angle within a range of about 80°-160°, and at least two of the V-shaped grooves of a groove unit have different apex angles.

In another aspect, the present invention is directed to a light guide plate. According to one embodiment of the present invention, the light guide plate comprises a top surface, a bottom surface opposite to the top surface and a light incident lateral surface between the top surface and the bottom surface. At least one surface of the light guide plate has a light guide plate microstructure of the embodiments of the present invention disposed thereon.

In yet another aspect, the present invention is directed to a backlight module. According to one embodiment of the present invention, the backlight module comprises a light guide plate of embodiments of the present invention and a plurality of LED light sources located on a light incident lateral surface of the light guide plate.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
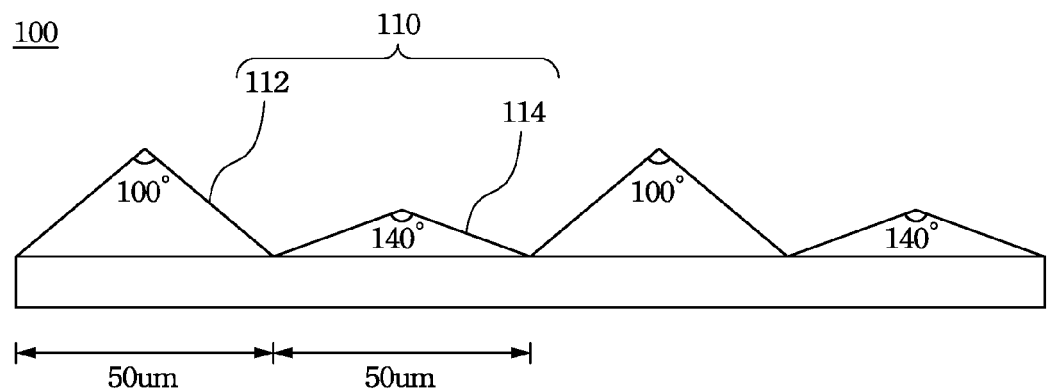
FIG. 1 is a partial cross-sectional view of a light guide plate of one embodiment of the present invention.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

LED light sources are disposed on the light incident lateral surface of a light guide plate. After coming into the light guide plate, light irradiated from LED light sources would propagate across the light guide plate by total reflection, and diffusive patterns or microstructures should be provided on at least one surface of the light guide plate so that the light can be directed toward a light exit surface (usually the top surface) of the light guide plate.

Generally, the light energy is higher at portions in the vicinity of the light sources and gradually decreases therefrom. Therefore, diffusive patterns or microstructures are usually arranged relative to the position of the light sources so that the diffusive efficiency is higher at portions more distant from the light sources and thus the exiting light can be made uniform. In this way, if it is desire to adjust the number or the position of the light sources used, the arrangement of the microstructure of the light guide plate has to be redesigned.

In view of the foregoing, in one aspect, the present invention is directed to a light guide plate microstructure. According to one embodiment of the present invention, the light guide plate microstructure is located on at least one surface of a light guide plate and comprises a plurality of groove units located continuously or discontinuously on said surface of the light guide plate.

According to embodiments of the present invention, a distance between a start point of one groove unit and a start point of the next groove unit is at most about 400 µm.

In various embodiments of the present invention, each of the groove units comprises a plurality of V-shaped grooves; more specifically, each groove unit may have two, three, four or more kinds of V-shaped grooves as long as it is desirable. According to principles and spirits of the present invention, each of the V-shaped grooves has an apex angle within a range of about 80°-160°, and at least two of the V-shaped grooves of a groove unit have different apex angles. Furthermore, each of the V-shaped grooves has a base width of about 5 µm-40 µm.

For purposes of illustration, but not as a limitation, a groove unit according to one embodiment of the present invention may comprise at least one first V-shaped groove and at least one second V-shaped groove. The first V-shaped groove has a first apex angle of about 80° to about 160°. The second V-shaped groove has a second apex angle of about 80° to about 160°, and the second apex angle is different from the first apex angle. According to this embodiment, the first V-shaped groove and second V-shaped groove each has a base width of about 5-400 µm. According to one embodiment of the present invention, the light guide plate microstructure is disposed on at least the top surface (light exit surface) of the light guide plate. According to another embodiment of the present invention, the light guide plate microstructure is disposed on at least the top surface and bottom surface of the light guide plate, and the orientation of the V-shaped grooves on the top surface is perpendicular to the V-shaped grooves on the bottom surface. According to still another embodiment of the present invention, the light guide plate microstructure is at least disposed on the top surface and the light incident lateral surface of the light guide plate. Furthermore, in various embodiments of the present invention, the bottom surface of the light guide plate may be a smooth surface or sand-blasted, and the light incident lateral surface of the light guide plate may be a smooth surface a rough.

In a backlight module, the distance between two LED light sources (LED pitch) is usually measured in millimeters, and in various embodiments of the present invention, a distance between a start point of one groove unit and a start point of the next groove unit is at most about 400 µm. Since the width of a groove unit is much smaller than the LED pitch, plenty sets of groove units would exist in a single LED pitch so that the light irradiated from LED can be made uniform. Accordingly, the disposition of groove units can be designed without considering the position of the LED light sources used.

Exemplary arrangements of the groove units according to embodiments of the present invention are described in the following paragraphs in connection with the accompanying drawings.

Embodiment 1

FIG. 1 is a partial cross-sectional view of a light guide plate of one embodiment of the present invention. In FIG. 1, the light guide plate 100 has a top surface which has the light guide plate microstructure disposed thereon. The light guide plate microstructure comprises a plurality of groove units 110 located continuously on the top surface. Each of the groove units 110 has a first V-shaped grooves 112 and a second V-shaped grooves 114. The first V-shaped grooves 112 has an apex angle of about 100°, while the second V-shaped grooves 114 has an apex angle of about 140°.

In this embodiment, the base width of each of the V-shaped grooves 112 and 114 is about 50 µm, and a bottom surface of the guide plate 100 can be a smooth surface or sand blasted.

Embodiment 2

Figure 2:
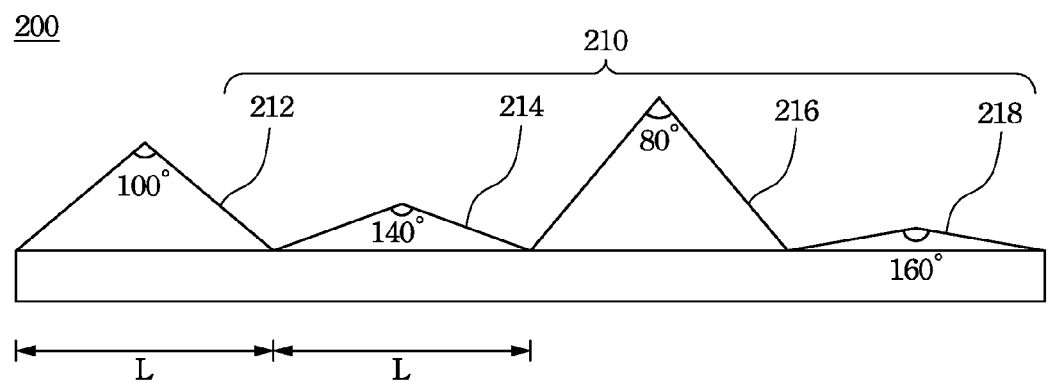
FIG. 2 is a partial cross-sectional view of a light guide plate of another embodiment of the present invention.

FIG. 2 is a partial cross-sectional view of a light guide plate of another embodiment of the present invention. In FIG. 2, the light guide plate microstructure is disposed on a top surface of the light guide plate 200. Each of the groove units 210 has a first V-shaped grooves 212, a second V-shaped grooves 214, a third V-shaped grooves 216 and a forth V-shaped grooves 128. The first V-shaped grooves 212 has an apex angle of about 100°; the second V-shaped grooves 214 has an apex angle of about 140°; the third V-shaped grooves 216 has an apex angle of about 80°; and the forth V-shaped grooves 128 has an apex angle of about 160°.

In this embodiment, the base width of each of the V-shaped grooves 212, 214, 216 and 218 is designated as L, and L is about 5 µm to 100 µm. Similarly to the first embodiment, a bottom surface of the guide plate 200 can be a smooth surface or sand blasted.

Embodiment 3

Figure 3A:
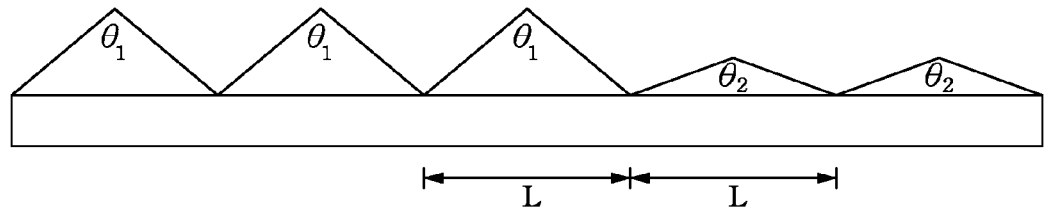
FIG. 3A is a partial cross-sectional view of a light guide plate of another embodiment of the present invention.
Figure 3B:
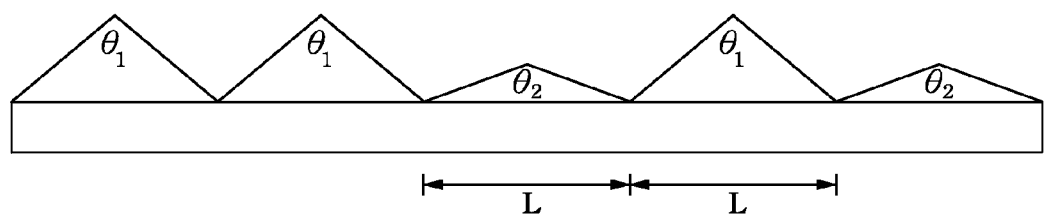
FIG. 3B is a partial cross-sectional view of a light guide plate of another embodiment of the present invention.

FIG. 3A and FIG. 3B are partial cross-sectional views each illustrating a light guide plate of two embodiments of the present invention. In FIG. 3A, a light guide plate microstructure is disposed on a top surface of the light guide plate 300; and in FIG. 3B, a light guide plate microstructure is disposed on a top surface of the light guide plate 350. Both of the light guide plate 300 and light guide plate 350 have a groove unit consisting of two kinds of V-shaped grooves with different apex angles ($\theta_1$ and $\theta_2$), and the only difference therebetween is that the sequence in which the V-shaped grooves appear in said two light guide plate microstructures is different.

In these embodiments, the value of $\theta_1$ and $\theta_2$ is about 80° to about 160°, wherein the value of $\theta_1$ is different from that of $\theta_2$, and the base width of each of the V-shaped grooves (L) is about 5-80 µm. Similarly, a bottom surface of the guide plate 300 and 350 can be a smooth surface or sand blasted.

Embodiment 4

Figure 4A:
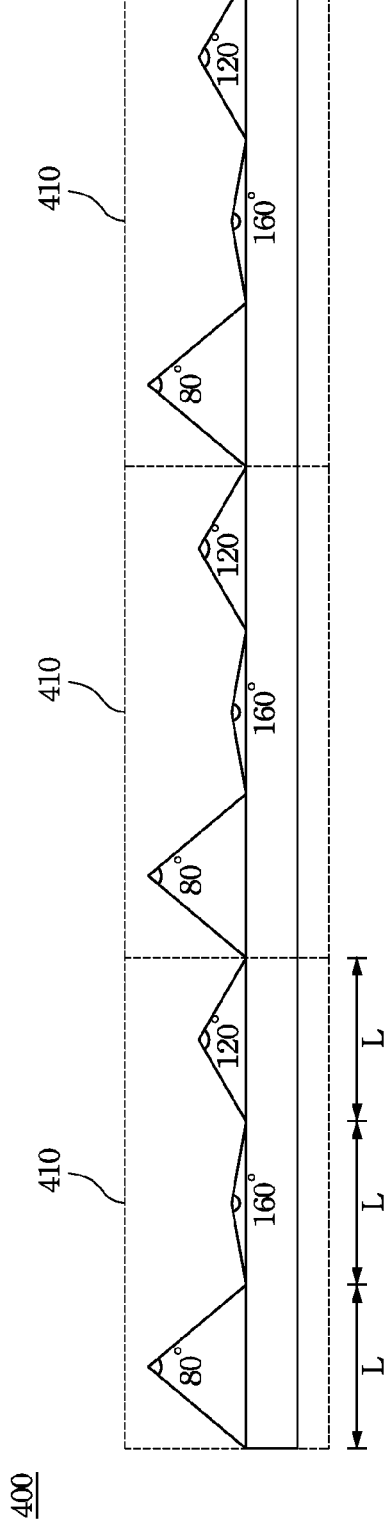
FIG. 4A is a partial cross-sectional view of a light guide plate of another embodiment of the present invention.
Figure 4B:
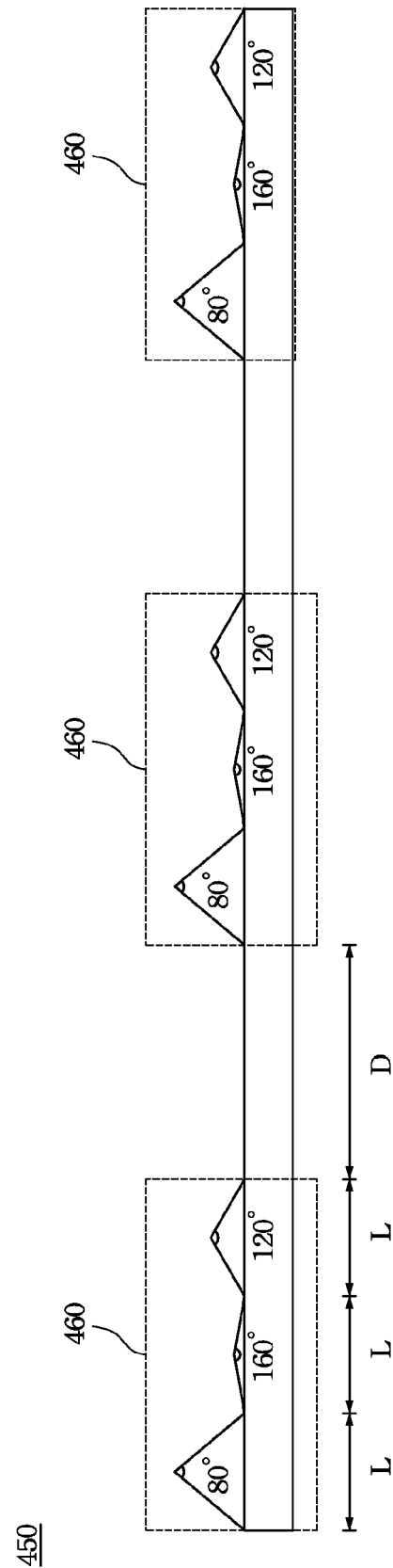
FIG. 4B is a partial cross-sectional view of a light guide plate of another embodiment of the present invention.

FIG. 4A and FIG. 4B are partial cross-sectional views each illustrating a light guide plate of two other embodiments of the present invention. In FIG. 4A, a light guide plate microstructure is disposed on a top surface of the light guide plate 400; and in FIG. 4B, a light guide plate microstructure is disposed on a top surface of the light guide plate 450. Groove unit 410 of the light guide plate 400 and groove unit 460 of the light guide plate 450 both consist of three kinds of V-shaped grooves with different apex angles (80°, 160° and 120°, respectively), and the only difference therebetween is that groove units 410 are disposed continuously on the top surface of the light guide plate 400 while groove units 460 are disposed discontinuously on the top surface of the light guide plate 450. Similarly, a bottom surface of the light guide plate 400 and the light guide plate 450 may be a smooth surface or sand blasted.

According to principles and spirits of the present invention, the base width L of each V-shaped groove is about 5-400 µm and a distance between a start point of one groove unit and a start point of the next groove unit is at most about 400 µm. Accordingly, in FIG. 4A, where the groove units are disposed continuously, the width of a groove unit 410 (3 L) should be equal to or smaller than 400 µm; and in FIG. 4B, where the groove units are disposed discontinuously, the sums of the width of a groove unit 460 (3 L) plus the interval between two groove units 460 (D) should be equal to or smaller than 400 µm.

Embodiment 5

Figure 5:
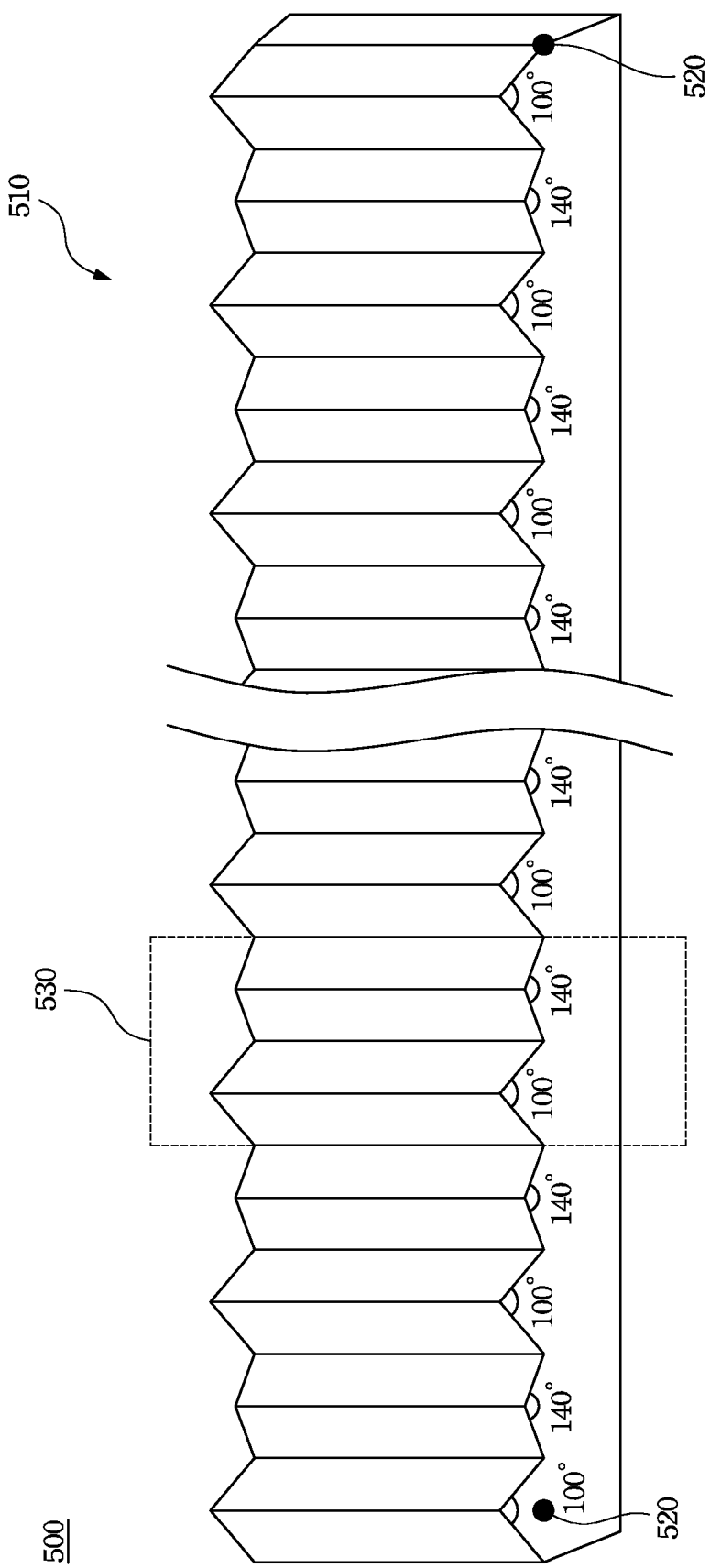
FIG. 5 is a partial cross-sectional view of a backlight module of one embodiment of the present invention.

FIG. 5 is a partial cross-sectional view of a backlight module of one embodiment of the present invention. In FIG. 5, the backlight module 500 comprises a light guide plate 510 and a plurality of LED light sources 520 located on a light incident lateral surface of the light guide plate 510. In this embodiment, a top surface of the light guide plate 510 has a plurality of groove units 530 disposed continuously thereon while a bottom surface of the light guide plate 500 may be a smooth surface or sand blasted.

In this embodiment, each groove unit 530 consists of a first V-shaped groove having an apex angel of about 100° and a second V-shaped groove having an apex angel of about 140°. However, the embodiments of the present invention are not limited to groove units having two V-shaped grooves, and any suitable numbers of V-shaped grooves can be used.

According to principles and spirits of the present invention, the base width L of each V-shaped groove is about 5-400 µm and the width of a single groove unit should be equal to or smaller than about 400 µm so that multiple groove units 530 can exist in an LED pitch (the distance between two successive LED light sources 520). For example, the LED pitch can be about 5.4 mm and the width of a groove unit 530 can be about 100 µm, and thus there are 54 sets of groove units 530 exist between two successive LED light sources 520.

Embodiment 6

Figure 6:
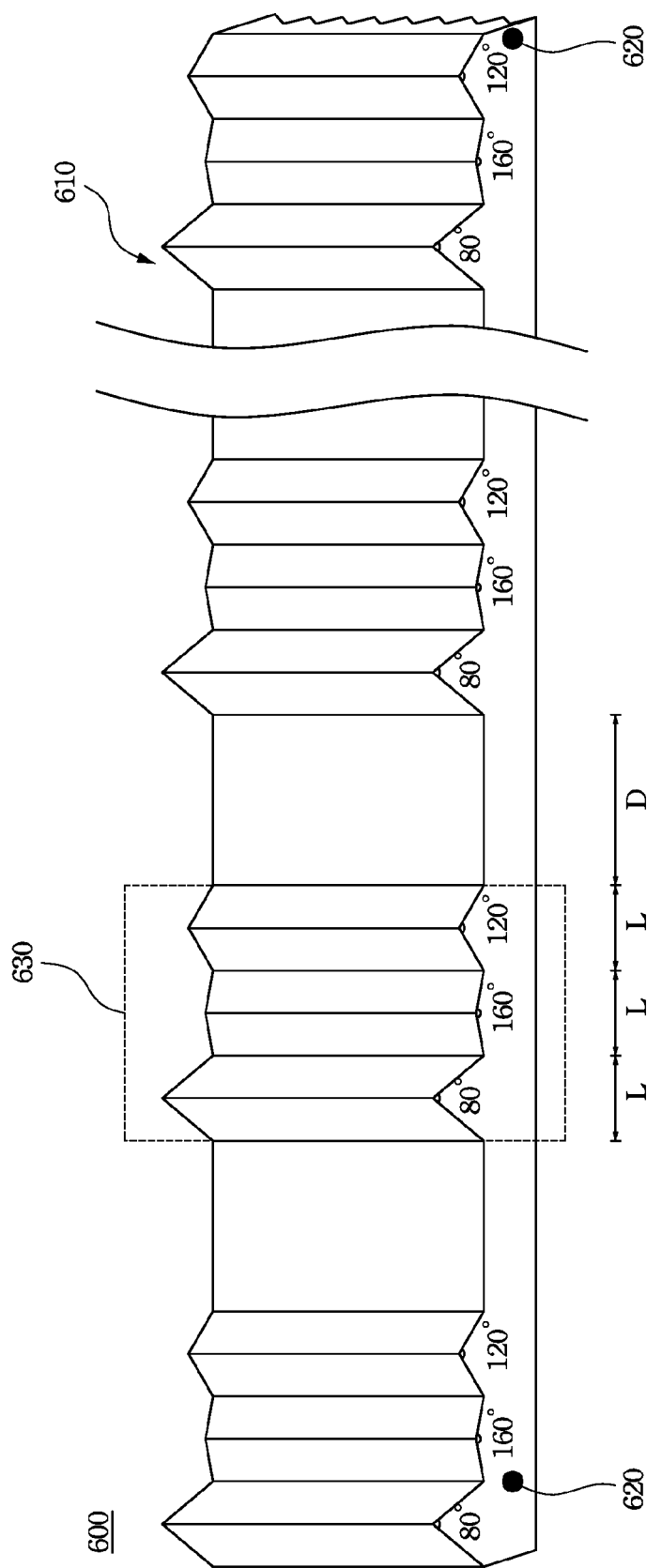
FIG. 6 is a partial cross-sectional view of a backlight module of another embodiment of the present invention.

FIG. 6 is a partial cross-sectional view of a backlight module of another embodiment of the present invention. In FIG. 6, the backlight module 600 comprises a light guide plate 610 and a plurality of LED light sources 620 located on a light incident lateral surface of the light guide plate 610. In this embodiment, a top surface of the light guide plate 610 has a light guide plate microstructure consisting of a plurality of groove units 630 disposed discontinuously thereon, and a bottom surface of the light guide plate 610 has another light guide plate microstructure consisting of a plurality of groove units 640 disposed continuously thereon. It should be noted that in a light guide plate having light guide plate microstructures on both of the top surface and the bottom surface, the orientation of the V-shaped grooves on the top surface and the orientation of the V-shaped grooves on the bottom surface are perpendicular to each other.

In this embodiment, each groove unit 630 consists of three V-shaped grooves each of which has an apex angel of about 80°, about 160° and about 120°, respectively. However, the embodiments of the present invention are not limited to groove units having three V-shaped grooves, and any suitable numbers of V-shaped grooves can be used.

In FIG. 6, the base width (L) of each V-shaped groove is designated as L, the interval between two groove units is designated as D. According to principles and spirits of the present invention, L is about 5 µm-400 µm and a distance between a start point of one groove unit 630 and a start point of the next groove unit 630 (3 L+D) is at most about 400 µm so that multiple groove units 560 can exist in an LED pitch (the distance between two successive LED light sources 620). For example, the LED pitch can be about 7.9 mm, the width of a groove unit 630 (3 L) can be about 300 µm, and D can be about 100 µm, and thus there are nearly 20 sets of groove units 630 exist between two successive LED light sources 620.

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention. For example, in other embodiments of the present invention, the base widths of the V-shaped grooves of a groove unit can be the same or different.

What is claimed is:

1. A light guide plate microstructure, located on at least one surface of a light guide plate, comprising:
 a plurality of groove units located continuously or discontinuously on at least one surface of the light guide plate, wherein each of the groove units comprises a plurality of V-shaped grooves, and wherein each of the V-shaped grooves has an apex angle within a range of about 80° -160°, wherein at least two of the V-shaped grooves of a groove unit have different apex angles, wherein a distance between a start point of one groove unit and a start point of the next groove unit is at most about 400 µm.

2. The light guide plate microstructure of claim 1, wherein each of the V-shaped grooves has a base width of about 5 µm to 400 µm.

3. The light guide plate microstructure of claim 1, wherein the light guide plate comprises a top surface, a bottom surface opposite to the top surface and a light incident lateral surface between the top surface and the bottom surface, and wherein said at least one surface is the top surface.

4. The light guide plate microstructure of claim 3, wherein said at least one surface further comprises the bottom surface.

5. The light guide plate microstructure of claim 3, wherein said at least one surface further comprises the light incident surface.

6. A light guide plate, comprising:
 a top surface having a light guide plate microstructure disposed thereon, wherein the light guide plate microstructure comprises a plurality of groove units located continuously or discontinuously on at least one surface of the light guide plate, wherein each of the groove units comprises a plurality of V-shaped grooves, wherein each of the V-shaped grooves has an apex angle within a range of about 80° -160°, wherein at least two of the V-shaped grooves of a groove unit have different apex angles, wherein a distance between a start point of one groove unit and a start point of the next groove unit is at most about 400 µm;
 a bottom surface opposite to the top surface; and
 a light incident lateral surface between the top surface and the bottom surface.

7. The light guide plate of claim 6, wherein each of the V-shaped grooves has a base width of about 5 µm to 400 µm.

8. The light guide plate of claim 6, wherein the bottom surface is sand blasted or provided with the light guide plate microstructure.

9. The light guide plate of claim 6, wherein the light incident lateral surface is a smooth surface, a rough surface or is provided with the light guide plate microstructure.

10. A backlight module, comprising:
a light guide plate having a light guide plate microstructure disposed on at least one surface thereof, wherein the light guide plate microstructure comprises a plurality of groove units located continuously or discontinuously on at least one surface of the light guide plate, wherein each of the groove units comprises a plurality of V-shaped grooves, wherein each of the V-shaped grooves has an apex angle within a range of about 80° to 160°, wherein at least two of the V-shaped grooves of a groove unit have different apex angles, wherein a distance between a start point of one groove unit and a start point of the next groove unit is at most about 400 μm; and
a plurality of LED light sources located on a light incident lateral surface of the light guide plate.

11. The backlight module of claim 10, wherein the LED light sources are spaced at a pitch of about 5 mm to 8 mm.

12. The backlight module of claim 10, wherein each V-shaped grooves has a base width of about 5 μm to 400 μm.

13. The backlight module of claim 10, wherein a bottom surface of the light guide plate is sand blasted or provided with the light guide plate microstructure.

14. The backlight module of claim 10, wherein a light incident lateral surface of the light guide plate is a smooth surface, a rough surface or is provided with the light guide plate microstructure.

* * * * *